(12) United States Patent
Lochner

(10) Patent No.: US 11,758,956 B2
(45) Date of Patent: Sep. 19, 2023

(54) PROTECTIVE FIRE GLOVE

(71) Applicant: FireCraft Safety Products, LLC, Columbus, OH (US)

(72) Inventor: Tom Lochner, Columbus, OH (US)

(73) Assignee: Firecraft Safety Products, LLC, Columbus, OH (US)

( * ) Notice: Subject to any disclaimer, the term of this patent is extended or adjusted under 35 U.S.C. 154(b) by 91 days.

(21) Appl. No.: 16/707,826

(22) Filed: Dec. 9, 2019

(65) Prior Publication Data
US 2021/0169161 A1      Jun. 10, 2021

(51) Int. Cl.
*A41D 19/00* (2006.01)
*A41D 19/015* (2006.01)
(Continued)

(52) U.S. Cl.
CPC ... *A41D 19/01529* (2013.01); *A41D 19/0006* (2013.01); *D04B 1/28* (2013.01);
(Continued)

(58) Field of Classification Search
CPC ........ D10B 2331/021; D10B 2501/041; D10B 2501/00–0632; D10B 2403/011; D10B 2331/10; D10B 2321/042; A41D 19/00–046; A41D 19/01529; A41D 19/0006; A41D 2400/10; A41D 2500/10; D04B 1/28; D06M 11/77; D06M 14/16;
(Continued)

(56) References Cited

U.S. PATENT DOCUMENTS 5,822,796 A * 10/1998 Harges, Jr. ....... A41D 19/01529
2/161.6
6,216,276 B1    4/2001 Eibert
(Continued)

FOREIGN PATENT DOCUMENTS

EP        1025765 A2      8/2000
EP        2263753 A1 * 12/2010    ............. A41D 13/00
(Continued)

OTHER PUBLICATIONS

Yuan, Jiayin, David Mecerreyes, and Markus Antonietti. "Poly (ionic liquid) s: An update." Progress in Polymer Science 38.7 (2013): 1009-1036. (Year: 2013).*

(Continued)

*Primary Examiner* — Matthew D Matzek
*Assistant Examiner* — Braelyn R Watson
(74) *Attorney, Agent, or Firm* — Dinsmore & Shohl LLP

(57) ABSTRACT

A fire protective glove includes a palm portion and a back portion. The palm portion includes a polymer impregnated layer constructed of aramid fibers, leather, or a combination thereof; and a palm moisture barrier layer that is interior to the polymer impregnated layer, the palm moisture barrier layer being constructed of polyurethane, polytetrafluroethylene, aramid fibers, or a combination thereof. The back portion includes a first back protective layer constructed of aramid fibers, leather, or a combination thereof; and a second back protective layer that is interior to the first back protective layer, the second back protective layer being constructed of aramid fibers, modacrylic, or a combination thereof.

8 Claims, 6 Drawing Sheets

(51) Int. Cl.
*D04B 1/28* (2006.01)
*D06M 101/34* (2006.01)
*D06M 11/77* (2006.01)
*D06M 14/16* (2006.01)

(52) U.S. Cl.
CPC ...... *A41D 2400/10* (2013.01); *A41D 2500/10* (2013.01); *D06M 11/77* (2013.01); *D06M 14/16* (2013.01); *D06M 2101/34* (2013.01); *D06M 2200/12* (2013.01); *D10B 2331/02* (2013.01); *D10B 2401/02* (2013.01); *D10B 2501/041* (2013.01); *Y10T 442/2213* (2015.04); *Y10T 442/2803* (2015.04)

(58) Field of Classification Search
CPC .......... D06M 2101/34; D06M 2200/12; B32B 2437/02; B32B 2571/00; B32B 1/00; B32B 27/322; B32B 2260/021; B32B 2260/046; B32B 2262/0269; B32B 2307/7246; B32B 5/026; B32B 9/025; B32B 2262/0246; B32B 5/26; B32B 27/40; B32B 2307/3065; Y10T 442/2213; Y10T 442/2803; A62B 17/003
USPC ............. 442/134, 135, 136–147; 2/159–169, 2/158–170
See application file for complete search history.

(56) References Cited

U.S. PATENT DOCUMENTS

| | | | |
|---|---|---|---|
| 6,594,830 B2 | 7/2003 | Geng | |
| 8,719,969 B2 * | 5/2014 | Curtis | A41D 31/085 2/458 |
| 2008/0242176 A1 * | 10/2008 | Jaeger | D06M 11/45 442/139 |
| 2009/0210991 A1 | 8/2009 | Tutor | |
| 2012/0185997 A1 | 7/2012 | Kirk, II et al. | |
| 2015/0121598 A1 * | 5/2015 | Mathews | A41D 19/01529 2/164 |
| 2017/0055609 A1 * | 3/2017 | Ragan | A41D 31/085 |
| 2018/0035734 A1 | 2/2018 | Zhu | |
| 2018/0125131 A1 | 5/2018 | Lee | |
| 2018/0127903 A1 * | 5/2018 | Thatcher | A61F 9/06 |

FOREIGN PATENT DOCUMENTS

| | | | |
|---|---|---|---|
| EP | 2583574 B1 | 7/2016 | |
| KR | 101014877 B1 | 2/2011 | |
| KR | 101538334 B1 | 7/2015 | |
| WO | WO-9938398 A1 * | 8/1999 | ........... A41D 31/085 |

OTHER PUBLICATIONS

National Urban Security Technology Laboratory, Structural Firefighting Gloves Market Survey Report, Oct. 2014, U.S. Department of Homeland Security (Year: 2014).*

Wei, Huijuan, et al. "Graphene and poly (ionic liquid) modified polyurethane sponges with enhanced flame-retardant properties." Journal of Applied Polymer Science 134.44 (2017): 45477. (Year: 2017).*

Bernard et al., Polyurethane-based poly (ionic liquid)s for CO2 removal from natural gas, J. Appl. Polym. Sci. 2019, 136, 47536 (Year: 2019).*

August Penkert Brochure for Protective Gloves https://www.penkert.com/fileadmin/documents/Broschueren/Englisch/Protective_gloves_2018.pdf published Jan. 2018; Mulheim, Germany (32 pages).

U.S. Department of Homeland Security—Science & Technology; Structural Firefighting Gloves Market Survey Report https://www.dhs.gov/sites/default/files/publications/Fire-Gloves-MSR_1014-508.pdf published Oct. 2014 (25 pages).

Dupont Website; Kevlar Thermal Protection Products Gloves & Sleeve https://www.dupont.com/products-and-services/fabrics-fibers-nonwovens/fibers/brands/kevlar/products/dupont-kevlar-thermal-protection.html accessed Sep. 30, 2019 (two pages).

* cited by examiner

PROTECTIVE FIRE GLOVE

TECHNICAL FIELD

Embodiments described herein generally relate to a multi-layered glove and, more specifically, to a protective fire glove.

BACKGROUND

Firefighting presents many different types of hazards against which firefighters must be protected. Firefighters encounter extreme heat, direct contact with fire and flash-flames, blood-borne pathogens, chemicals, water, steam, and the like. Furthermore, gloves used by firefighters must protect against impacts, punctures, and cuts.

While many current firefighting gloves are compliant with National Fire Protection Association (NFPA) 1971-2018 Edition Standards, various features for these types of gloves remain deficient. As such, a need exists in the industry for an improved protective fire glove.

SUMMARY

According to a first aspect of the present disclosure, a fire protective glove includes a palm portion and a back portion. The palm portion may include a polymer impregnated layer constructed of aramid fibers, leather, or a combination thereof; and a palm moisture barrier layer that is interior to the polymer impregnated layer, the palm moisture barrier layer being constructed of polyurethane, polytetrafluoroethylene, aramid fibers, or a combination thereof. The back portion may include a first back protective layer constructed of aramid fibers, leather, or a combination thereof; and a second back protective layer that is interior to the first back protective layer, the second back protective layer being constructed of aramid fibers, modacrylic, or a combination thereof.

According to a second aspect of the present disclosure, a fire protective glove includes a palm portion and a back portion. The palm portion may include a polymer impregnated layer constructed of a silicone impregnated para-aramid fiber knit; a palm moisture barrier layer that is interior to the polymer impregnated layer, the palm moisture barrier layer being constructed of poly(ionic liquid)s; a first palm protective layer that is interior to the palm moisture barrier layer, the first palm protective layer being constructed of a meta-aramid fiber knit; and a second palm protective layer that is interior to the first palm protective layer, the second palm protective layer including a plurality of sublayers bonded to one another, each of the plurality of sublayers of the second palm protective layer being constructed of a meta-aramid fiber knit. The back portion may include a first back protective layer constructed of a para-aramid fiber knit; a second back protective layer that is interior to the first back protective layer, the second back protective layer including a plurality of sublayers, each of the plurality of sublayers of the second back protective layer being constructed of a meta-aramid fiber knit; a back moisture barrier layer that is interior to the second back protective layer, the back moisture barrier layer being constructed of poly(ionic liquid)s; and a third back protective layer that is interior to the back moisture barrier layer, the third back protective layer including a plurality of sublayers bonded to one another, each of the plurality of sublayers of the third back protective layer being constructed of a meta-aramid fiber knit.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
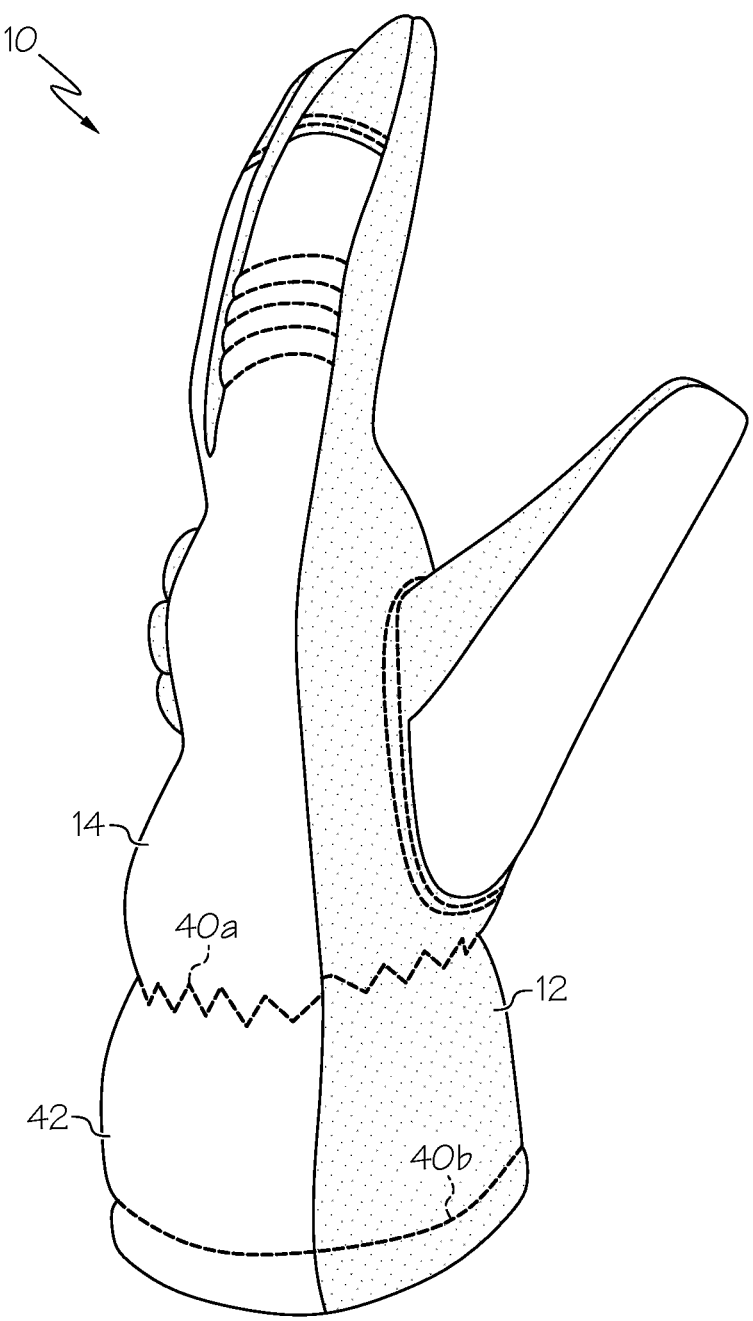
FIG. 1 depicts a perspective side view of an exemplary embodiment of a protective fire glove, wherein the protective fire glove includes a palm portion and a back portion, according to embodiments described herein.

The present disclosure provides a multi-layered protective fire glove that is dexterous and may be washed multiple times without degradation. The protective fire glove according to embodiments described herein includes a multi-layered structure, which provides a level of protection that is in compliance with NFPA 1971-2018 Edition Standards. The protective fire glove according to embodiments described herein provides a high level of dexterity coupled with this high level of heat protection. The materials of the protective fire glove are selected such that a balance is achieved between dexterity and protection provided by the protective fire glove. The protective fire glove according to embodiments described herein may withstand numerous washings (e.g., 50 times, 100 times, 500 times, etc.) without substantial loss to either the heat protection or the dexterity. The cleanability of the protective fire glove is important as washing of firefighting equipment is now more common as a result of cancer (e.g., carcinogens) mitigation protocol.

In accordance with one aspect of the present disclosure, a fire protective glove includes a palm portion and a back portion. The palm portion includes a polymer impregnated layer and a palm moisture barrier layer that is interior to the polymer impregnated layer. The polymer impregnated layer is constructed of aramid fibers, leather, or a combination thereof. The palm moisture barrier layer is constructed of polyurethane, polytetrafluoroethylene, aramid fibers, or a combination thereof.

In one embodiment, the polymer impregnated layer is constructed of a material impregnated with silicone. Similarly, some embodiments of the polymer impregnated layer include a silicone impregnated para-aramid fiber knit. In some embodiments, the palm moisture barrier layer is constructed of poly(ionic liquid)s. In another embodiment, the first back protective layer is constructed of a para-aramid fiber knit. In some embodiments, the second back protective layer includes a plurality of sublayers. In embodiments, each of the plurality of sublayers of the second back protective layer is constructed of a meta-aramid fiber knit.

In another embodiment, the palm portion further comprises a first palm protective layer that is interior to the palm moisture barrier layer, the first palm protective layer being constructed of aramid fibers, modacrylic, or a combination thereof. Similarly, in some embodiments, the first palm protective layer is constructed of a meta-aramid fiber knit. In some embodiments, the palm portion further comprises a second palm protective layer that is interior to the first palm protective layer, the second palm protective layer being constructed of aramid fibers, modacrylic, or a combination thereof. In another embodiment, the second palm protective layer includes a plurality of sublayers, one of the plurality of sublayers being bonded to another of the plurality of sublayers. In some embodiments, each of the plurality of sublayers of the second palm protective layer is constructed of a meta-aramid fiber knit.

In another embodiment, the back portion further comprises a back moisture barrier layer that is interior to the second back protective layer, the back moisture barrier layer being constructed of polyurethane, polytetrafluoroethylene, aramid fibers, or a combination thereof. In some embodiments, the back moisture barrier layer is constructed poly(ionic liquid)s. In some embodiments, the back portion further comprises a third back protective layer that is interior to the back moisture barrier layer, the third back protective layer being constructed of aramid fibers, modacrylic, or a combination thereof. In another embodiment, the third back protective layer includes a plurality of sublayers, one of the plurality of sublayers being bonded to another of the plurality of sublayers. Similarly, in some embodiments, each of the plurality of sublayers of the third back protective layer is constructed of a meta-aramid fiber knit.

In accordance with a second aspect of the present disclosure, a first protective glove comprises a palm portion and a back portion. The palm portion comprises a polymer impregnated layer, a palm moisture barrier layer that is interior to the polymer impregnated layer, a first palm protective layer that is interior to the palm moisture barrier layer, and a second palm protective layer that is interior to the first palm protective layer. The polymer impregnated layer is constructed of a silicone impregnated para-aramid fiber knit. The palm moisture barrier layer is constructed of poly(ionic liquid)s. The first palm protective layer is constructed of a meta-aramid fiber knit. The second palm protective layer includes a plurality of sublayers bonded to one another, each of the plurality of sublayers of the second palm protective layer being constructed of a meta-aramid fiber knit. The back portion comprises a first back protective layer, a second back protective layer that is interior to the first back protective layer, a back moisture barrier layer that is interior to the second back protective layer, and a third back protective layer that is interior to the back moisture barrier layer. The first back protective layer is constructed of a para-aramid fiber knit. The second back protective layer includes a plurality of sublayers, each of the plurality of sublayers of the second back protective layer being constructed of a meta-aramid fiber knit. The back moisture barrier layer is constructed of poly(ionic liquid)s. The third back protective layer includes a plurality of sublayers bonded to one another, each of the plurality of sublayers of the third back protective layer being constructed of a meta-aramid fiber knit.

Additional advantages of the fire protective glove described herein will be set forth, and in part will be readily apparent to those skilled in the art from that description or recognized by practicing the embodiments described herein, including the detailed description, the claims, as well as the appended drawings.

References will now be made in detail to the drawings, which depict various embodiments of a fire protective glove. According to one embodiment, a fire protective glove includes a palm portion including a polymer impregnated layer and a palm moisture barrier layer; and a back portion including a first back protective layer and a second back protective layer. In some embodiments, the polymer impregnated layer and the first back protective layer are constructed of aramid fibers, leather, or a combination thereof. In embodiments, the palm moisture barrier layer is constructed of polyurethane, polytetrafluoroethylene, aramid fibers, or a combination thereof. In some embodiments, the second back protective layer is constructed of aramid fibers, modacrylic, or a combination thereof. In embodiments, the palm portion further comprises a first palm protective layer that is interior to the palm moisture barrier layer, the first palm protective layer being constructed of aramid fibers, modacrylic, or a combination thereof. In some embodiments, the palm portion further comprises a second palm protective layer that is interior to the first palm protective layer, the second palm protective layer being constructed of aramid fibers, modacrylic, or a combination thereof. In embodiments, the back portion further comprises a back moisture barrier layer that is interior to the second back protective layer, the back moisture barrier layer being constructed of polyurethane, polytetrafluoroethylene, aramid fibers, or a combination thereof. In some embodiments, the back portion further comprises a third back protective layer that is interior to the back moisture barrier layer, the third back protective layer being constructed of aramid fibers, modacrylic, or a combination thereof.

Various embodiments of a fire protective glove will now be described in further detail herein with specific references to the illustrative drawings.

Figure 2:
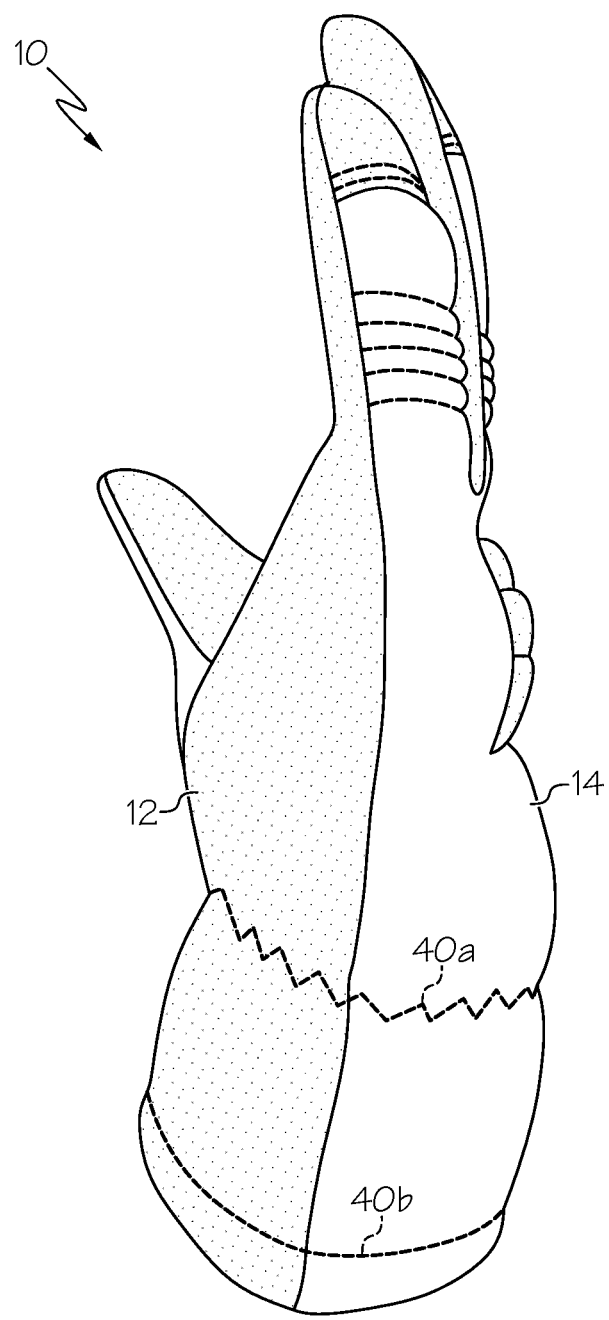
FIG. 2 depicts another perspective side view of the protective fire glove of FIG. 1, according to embodiments described herein.
Figure 3:
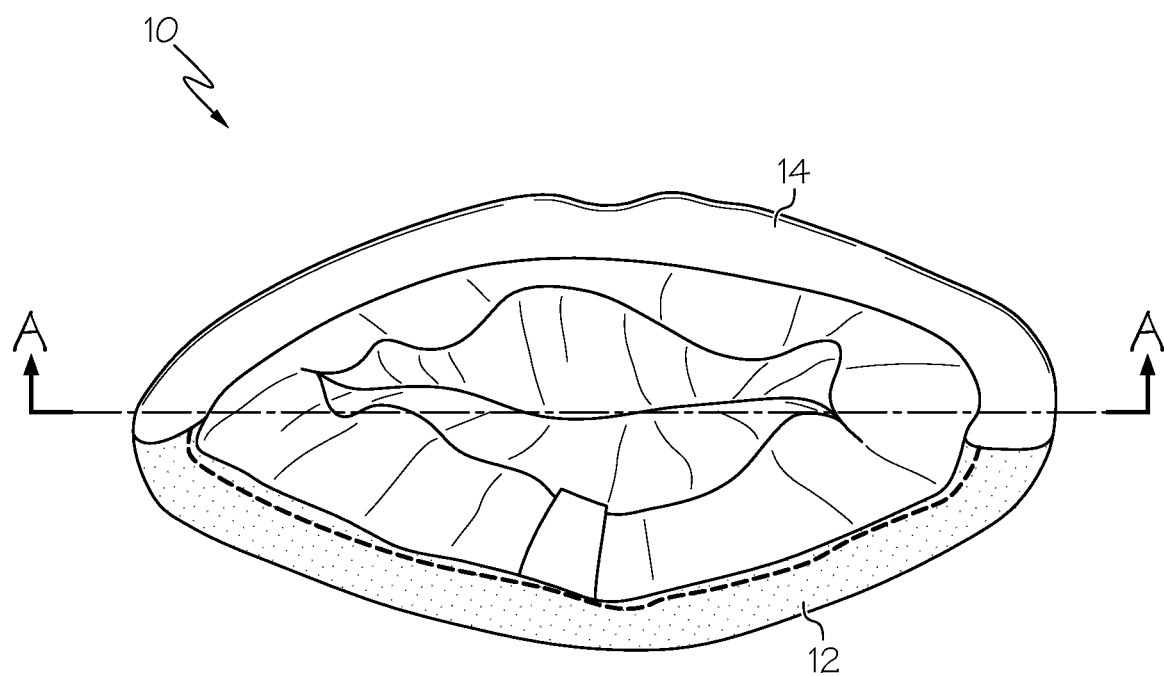
FIG. 3 depicts a perspective view of a cuff portion of the protective fire glove of FIG. 1.

Referring now to the drawings, FIGS. 1-7 depict a fire protective glove 10 according to embodiments described herein. As illustrated in FIGS. 1-3, the fire protective glove 10 includes a palm portion 12 and a back portion 14. The palm portion 12 is shaped to at least overlay a palm of a hand of a user. The back portion 14 is shaped to at least overlay a back of the hand of the user. While in some embodiments, the palm portion and the back portion may be constructed of a single piece of material (for at least one of the layers), the embodiment of FIG. 1 depicts that the palm portion 12 may be secured to the back portion 14 by stitching or other type of fastening.

Figure 4:
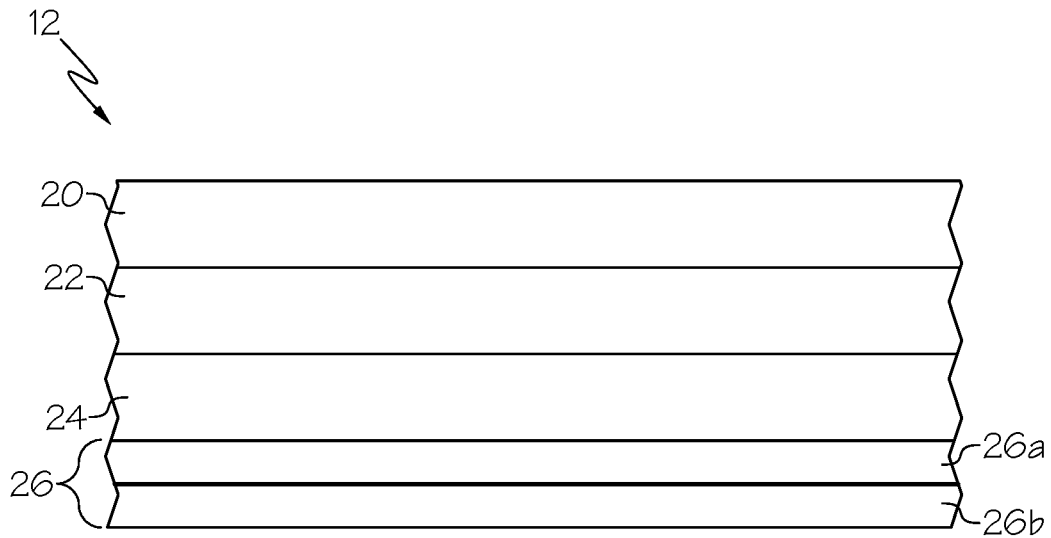
FIG. 4 depicts a sectional view of the palm portion taken along line A-A of FIG. 3, wherein the palm portion includes a polymer impregnated layer, a palm moisture barrier layer, a first palm protective layer, and a second palm protective layer, according to embodiments described herein.

Referring now to FIG. 4, the palm portion 12 includes a polymer impregnated layer 20 and a palm moisture barrier layer 22. The polymer impregnated layer 20 may provide a secure grip to a user in wet and dry conditions. The polymer impregnated layer 20 may be constructed of aramid fibers, leather, and/or other similar materials. The polymer impregnated layer 20 may be constructed of para-aramid fibers, such as para-aramid fibers sold under the Kevlar® brand. The polymer impregnated layer 20 may be constructed of meta-aramid fibers, such as meta-aramid fibers sold under the Nomex® brand.

The polymer impregnated layer 20 may be constructed of a material having a blend of fibers including aramid fibers, such as materials sold under the PBI® Gold brand. The polymer impregnated layer 20 may be constructed of a material impregnated with a polymer, such as silicone. The polymer impregnated in the material may not only provide grip to a user, but may also provide an additional level of protection not afforded by a material not impregnated with a polymer. In some embodiments, the polymer impregnated layer 20 may be constructed of a material having a weight in the range from greater than or equal to about 200 gsm to less than or equal to about 400 gsm, from greater than or equal to about 250 gsm to less than or equal to about 400 gsm, from greater than or equal to about 300 gsm to less than or equal to about 400 gsm, from greater than or equal to about 320 gsm to less than or equal to about 400 gsm, from greater than or equal to about 340 gsm to less than or equal to about 400 gsm, or from greater than or equal to about 360 gsm to less than or equal to about 400 gsm.

In some embodiments, the polymer impregnated layer 20 may be constructed of a material having a weight of greater than or equal to about 200 gsm, greater than or equal to about 250 gsm, greater than or equal to about 300 gsm, greater than or equal to about 320 gsm, greater than or equal to about 340 gsm, or greater than or equal to about 360 gsm. In other embodiments, the polymer impregnated layer 20 may be constructed of a material having a weight of less than or equal to about 400 gsm. In embodiments, the polymer impregnated layer 20 may be constructed of a woven material, a knit material, and/or other similar materials. In embodiments, the polymer impregnated layer 20 may be constructed of a silicone impregnated para-aramid fiber knit, such as silicone impregnated Kevlar® knit (e.g., 380 gsm black silicone coated Kevlar® fabric (Jiaxing Fuliong & Textile Technology, China)).

The palm moisture barrier layer 22 may be interior to the polymer impregnated layer 20 as illustrated in FIG. 4. The palm moisture barrier layer 22 may be constructed of polyurethane, polytetrafluoroethylene, aramid fibers, and/or other similar materials. The palm moisture barrier layer 22 may be constructed of polyurethane such as poly(ionic liquid)s (PILS). The palm moisture barrier layer 22 may be constructed of polytetrafluroethylene (PTFE), such as materials sold under the Gore-Tex® brand. The palm moisture barrier layer 22 may be constructed of a waterproof membrane, such as materials sold under the Porelle® brand. The palm moisture barrier layer 22 may be constructed of materials sold under the Pyrotect brand made by Insert Technology, Inc. (Haverhill, Mass.). The palm moisture barrier layer 22 may be constructed of materials made by EUROTEX GmbH (Bielefeld, Germany). The palm moisture barrier layer 22 may be constructed of materials sold under the Hipora™ brand made by Kolon Industries (Seoul, Republic of Korea).

The palm portion 12 may further include a first palm protective layer 24. As illustrated in FIG. 4, the first palm protective layer 24 is interior to the palm moisture barrier layer 22. The first palm protective layer 24 may be constructed of aramid fibers, modacrylic, and/or other similar materials. The first palm protective layer 24 may be constructed of para-aramid fibers, such as para-aramid fibers sold under the Kevlar® brand. The first palm protective layer 24 may be constructed of meta-aramid fibers, such as meta-aramid fibers sold under the Nomex® brand. The first palm protective layer 24 may be constructed of a blend of para-aramid fibers and meta-aramid fibers, such as a blend of para-aramid fibers sold under the Kevlar® brand and meta-aramid fibers sold under the Nomex® brand.

The first palm protective layer 24 may be constructed of a material having a blend of fibers including aramid fibers, such as materials sold under the Kovenex™ brand. In embodiments, the first palm protective layer 24 may be constructed of a material having a weight in the range from greater than or equal to about 100 gsm to less than or equal to about 225 gsm, from greater than or equal to about 125 gsm to less than or equal to about 200 gsm, or from greater than or equal to about 150 gsm to less than or equal to about 190 gsm. In some embodiments, the first palm protective layer 24 may be constructed of a material having a weight of greater than or equal to about 100 gsm, greater than or equal to about 125 gsm, greater than or equal to about 150 gsm, or greater than or equal to about 175 gsm.

In other embodiments, the first palm protective layer 24 may be constructed of a material having a weight of less than or equal to about 225 gsm, less than or equal to about 200 gsm, or less than or equal to about 190 gsm. In embodiments, the first palm protective layer 24 may be constructed of a woven material, a knit material, and/or other similar materials. In some embodiments, the first palm protective layer 24 may be constructed of a felt material, a fleece material, and/or other similar materials. In embodiments, the first palm protective layer 24 may be constructed of a meta-aramid fiber knit, such as Nomex® knit (e.g., 180 gsm Nomex® knit (Escort International, Pakistan)).

The palm portion 12 may further include a second palm protective layer 26. As illustrated in FIG. 4, the second palm protective layer 26 is interior to the first palm protective layer 24. The second palm protective layer 26 may include a plurality of sublayers 26a, 26b. The second palm protective layer 26 or each of the plurality of sublayers 26a, 26b may be constructed of aramid fibers, modacrylic, and/or other similar materials. The second palm protective layer 26 or each of the plurality of sub layers 26a, 26b may be constructed of para-aramid fibers, such as para-aramid fibers sold under the Kevlar® brand. The second palm protective layer 26 or each of the plurality of sublayers 26a, 26b may be constructed of meta-aramid fibers, such as meta-aramid fibers sold under the Nomex® brand. The second palm protective layer 26 or each of the plurality of sublayers 26a, 26b may be constructed of a blend of para-aramid fibers and meta-aramid fibers, such as a blend of para-aramid fibers sold under the Kevlar® brand and meta-aramid fibers sold under the Nomex® brand.

The second palm protective layer 26 or each of the plurality of sublayers 26a, 26b may be constructed of a material having a blend of fibers including aramid fibers, such as materials sold under the Kovenex™ brand. Each of the plurality of sublayers 26a, 26b may be made of the same material or different material as another of the plurality of sublayers 26a, 26b. In embodiments, the second palm protective layer 26 or each of the plurality of sublayers 26a, 26b may be constructed of a material having a weight in the range from greater than or equal to about 200 gsm to less than or equal to about 300 gsm, from greater than or equal to about 215 gsm to less than or equal to about 275 gsm, or from greater than or equal to about 225 gsm to less than or equal to about 250 gsm. In some embodiments, the second palm protective layer 26 or each of the plurality of sublayers 26a, 26b may be constructed of a material having a weight of greater than or equal to about 200 gsm, greater than or equal to about 215 gsm, or greater than or equal to about 225 gsm. In other embodiments, the second palm protective layer 26 or each of the plurality of sublayers 26a, 26b may be constructed of a material having a weight of less than or equal to about 300 gsm, less than or equal to about 275 gsm, or less than or equal to about 250 gsm. In embodiments, the second palm protective layer 26 or each of the plurality of sublayers 26a, 26b may be constructed of a woven material, a knit material, and/or other similar materials. In embodiments, the second palm protective layer 26 or each of the plurality of sublayers 26a, 26b may be constructed of a felt material, a fleece material, and/or other similar materials. In embodiments, the second palm protective layer 26 or each of the plurality of sublayers 26a, 26b may be constructed of a meta-aramid fiber knit, such as Nomex® knit (e.g., 240 gsm Nomex® knit (Escort International, Pakistan)). One of the plurality of sublayers 26a, 26b of the second palm protective layer 26 may be bonded to another of the plurality of sublayers 26a, 26b. The bonded sublayers 26a, 26b may be bonded to each other with an adhesive such as liquid latex.

Figure 5:
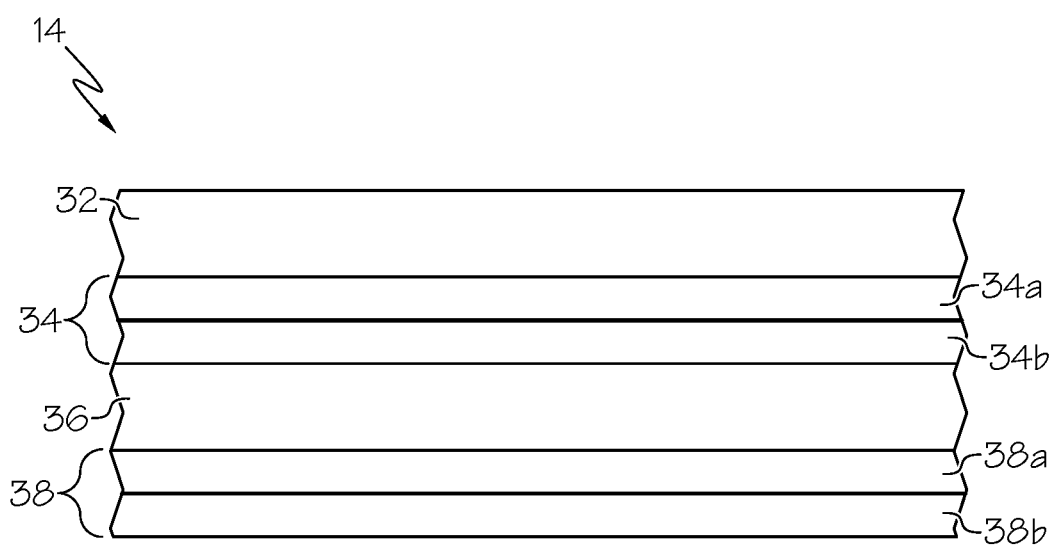
FIG. 5 depicts a sectional view of the back portion taken along line A-A of FIG. 3, wherein the back portion includes a first back protective layer, a second back protective layer, a back moisture barrier layer, and a third back protective layer, according to embodiments described herein.

Referring now to FIG. 5, the back portion 14 includes a first back protective layer 32 and a second back protective layer 34. The first back protective layer 32 may be constructed of aramid fibers, leather, and/or other similar materials. The first back protective layer 32 may be constructed of para-aramid fibers, such as para-aramid fibers sold under the Kevlar® brand. The first back protective layer 32 may be constructed of meta-aramid fibers, such as meta-aramid fibers sold under the Nomex® brand. The first back protective layer 32 may be constructed of a material having a blend of fibers including aramid fibers, such as materials sold under the PBI® Gold brand.

In embodiments, the first back protective layer 32 may be constructed of a material having a weight in the range from greater than or equal to about 200 gsm to less than or equal to about 400 gsm, from greater than or equal to about 250 gsm to less than or equal to about 400 gsm, from greater than or equal to about 300 gsm to less than or equal to about 400 gsm, from greater than or equal to about 320 gsm to less than or equal to about 400 gsm, from greater than or equal to about 340 gsm to less than or equal to about 380 gsm, or from greater than or equal to about 360 gsm to less than or equal to about 400 gsm. In some embodiments, the first back protective layer 32 may be constructed of a material having a weight of greater than or equal to about 200 gsm, greater than or equal to about 250 gsm, greater than or equal to about 300 gsm, greater than or equal to about 320 gsm, or greater than or equal to about 340 gsm.

In some embodiments, the first back protective layer 32 may be constructed of a material having a weight of less than or equal to about 400 gsm or less than or equal to about 380 gsm. In embodiments, the first back protective layer 32 may be constructed of a woven material, a knit material, and/or other similar materials. In embodiments, the first back protective layer 32 may be constructed of a para-aramid fiber knit, such as Kevlar® knit (e.g., 360 gsm yellow Kevlar® knit (Escort International, Pakistan)).

The second back protective layer 34 is interior to the first back protective layer 32 as illustrated in FIG. 5. The second back protective layer 34 may include a plurality of sublayers 34a, 34b. The second back protective layer 34 or each of the plurality of sublayers 34a, 34b may be constructed of aramid fibers, modacrylic, and/or other similar materials. The second back protective layer 34 or each of the plurality of sublayers 34a, 34b may be constructed of para-aramid fibers, such as para-aramid fibers sold under the Kevlar® brand. The second back protective layer 34 or each of the plurality of sublayers 34a, 34b may be constructed of meta-aramid fibers, such as meta-aramid fibers sold under the Nomex® brand.

The second back protective layer 34 or each of the plurality of sublayers 34a, 34b may be constructed of a blend of para-aramid fibers and meta-aramid fibers, such as a blend of para-aramid fibers sold under the Kevlar® brand and meta-aramid fibers sold under the Nomex® brand. The second back protective layer 34 or each of the plurality of sublayers 34a, 34b may be constructed of a material having a blend of fibers including aramid fibers, such as materials sold under the Kovenex™ brand. Each of the plurality of sublayers 34a, 34b may be made of the same material or different material as another of the plurality of sublayers 34a, 34b. In embodiments, the second back protective layer 34 or each of the plurality of sublayers 34a, 34b may be constructed of a material having a weight in the range from greater than or equal to about 200 gsm to less than or equal to about 300 gsm, from greater than or equal to about 215 gsm to less than or equal to about 275 gsm, or from greater than or equal to about 225 gsm to less than or equal to about 250 gsm.

In some embodiments, the second back protective layer 34 or each of the plurality of sublayers 34a, 34b may be constructed of a material having a weight of greater than or equal to about 200 gsm, greater than or equal to about 215 gsm, or greater than or equal to about 225 gsm. In other embodiments, the second back protective layer 34 or each of the plurality of sublayers 34a, 34b may be constructed of a material having a weight of less than or equal to about 300 gsm, less than or equal to about 275 gsm, or less than or equal to about 250 gsm. In embodiments, the second back protective layer 34 or each of the plurality of sublayers 34a, 34b may be constructed of a woven material, a knit material, and/or other similar materials. In embodiments, the second back protective layer or each of the plurality of sublayers 34a, 34b may be constructed of a felt material, a fleece material, and/or other similar materials. In embodiments, the second back protective layer 34 or each of the plurality of sublayers 34a, 34b may be constructed of a meta-aramid fiber knit, such as Nomex® knit (e.g., 240 gsm Nomex® knit (Escort International, Pakistan)).

The back portion 14 may further include a back moisture barrier layer 36. As illustrated in FIG. 5, the back moisture barrier layer 36 is interior to the second back protective layer 34. The back moisture barrier layer 36 may be constructed of polyurethane, polytetrafluoroethylene, aramid fibers, and/or other similar materials. The back moisture barrier layer 36 may be constructed of polyurethane such as poly(ionic liquid)s (PILS). The back moisture barrier layer 36 may be constructed of polytetrafluoroethylene (PTFE), such as materials sold under the Gore-Tex® brand. The back moisture barrier layer 36 may be constructed of a waterproof membrane, such as materials sold under the Porelle® brand. The back moisture barrier layer 36 may be constructed of materials sold under the Pyrotect brand made by Insert Technology, Inc. (Haverhill, Mass.). The back moisture barrier layer 36 may be constructed of materials made by EUROTEX GmbH (Bielefeld, Germany). The back moisture barrier layer 36 may be constructed of materials sold under the Hipora™ brand made by Kolon Industries (Seoul, Republic of Korea).

The back portion 14 may further include a third back protective layer 38. As illustrated in FIG. 5, the third back protective layer 38 is interior to the back moisture barrier layer 36. The third back protective layer 38 may include a plurality of sublayers 38a, 38b. The third back protective layer 38 or each of the plurality of sublayers 38a, 38b may be constructed of aramid fibers, modacrylic, and/or other similar materials. The third back protective layer 38 or each of the plurality of sublayers 38a, 38b may be constructed of para-aramid fibers, such as para-aramid fibers sold under the Kevlar® brand.

The third back protective layer 38 or each of the plurality of sublayers 38a, 38b may be constructed of meta-aramid fibers, such as meta-aramid fibers sold under the Nomex® brand. The third back protective layer 38 or each of the plurality of sublayers 38a, 38b may be constructed of a blend of para-aramid fibers and meta-aramid fibers, such as a blend of para-aramid fibers sold under the Kevlar® brand and meta-aramid fibers sold under the Nomex® brand. The third back protective layer 38 or each of the plurality of sublayers 38a, 38b may be constructed of a material having a blend of fibers including aramid fibers, such as materials sold under the Kovenex™ brand.

Each of the plurality of sublayers 38a, 38b of the third back protective layer 38 may be made of the same material or different material as another of the plurality of sublayers 38a, 38b. In embodiments, the third back protective layer 38 or each of the plurality of sublayers 38a, 38b may be constructed of a material having a weight in the range from greater than or equal to about 200 gsm to less than or equal to about 300 gsm, from greater than or equal to about 215 gsm to less than or equal to about 275 gsm, or from greater than or equal to about 225 gsm to less than or equal to about 250 gsm.

In some embodiments, the third back protective layer 38 or each of the plurality of sublayers 38a, 38b may be constructed of a material having a weight of greater than or equal to about 200 gsm, greater than or equal to about 215 gsm, or greater than or equal to about 225 gsm. In other embodiments, the third back protective layer 38 or each of the plurality of sublayers 38a, 38b may be constructed of a material having a weight of less than or equal to about 300 gsm, less than or equal to about 275 gsm, or less than or equal to about 250 gsm. In embodiments, the third back protective layer 38 or each of the plurality of sublayers 38a, 38b may be constructed of a woven material, a knit material, and/or other similar materials.

In embodiments, the third back protective layer 38 or each of the plurality of sublayers 38a, 38b may be constructed of a felt material, a fleece material, and/or other similar materials. In embodiments, the third back protective layer 38 or each of the plurality of sublayers 38a, 38b may be constructed of a meta-aramid fiber knit, such as Nomex® knit (e.g., 240 gsm Nomex® knit (Escort International, Pakistan)). One of the plurality of sublayers 38a, 38b of the third back protective layer 38 may be bonded to another of the plurality of sublayers 38a, 38b. The bonded sublayers 38a, 38b may be bonded to each other with an adhesive such as liquid latex.

Referring back to FIGS. 1 and 2, the layers 20, 22, 24, and 26 of the palm portion 12 (FIG. 4) and the layers 32, 34, 36, and 38 of the back portion 14 (FIG. 5) may be secured to each other by stitching, such as by stitch 40a and stitch 40b, or other type of fastening. Stitch 40a and stitch 40b may include a single stitch (as shown), a double, or triple stitch. Stitch 40a and stitch 40b may define a cuff portion 42.

Figure 6:
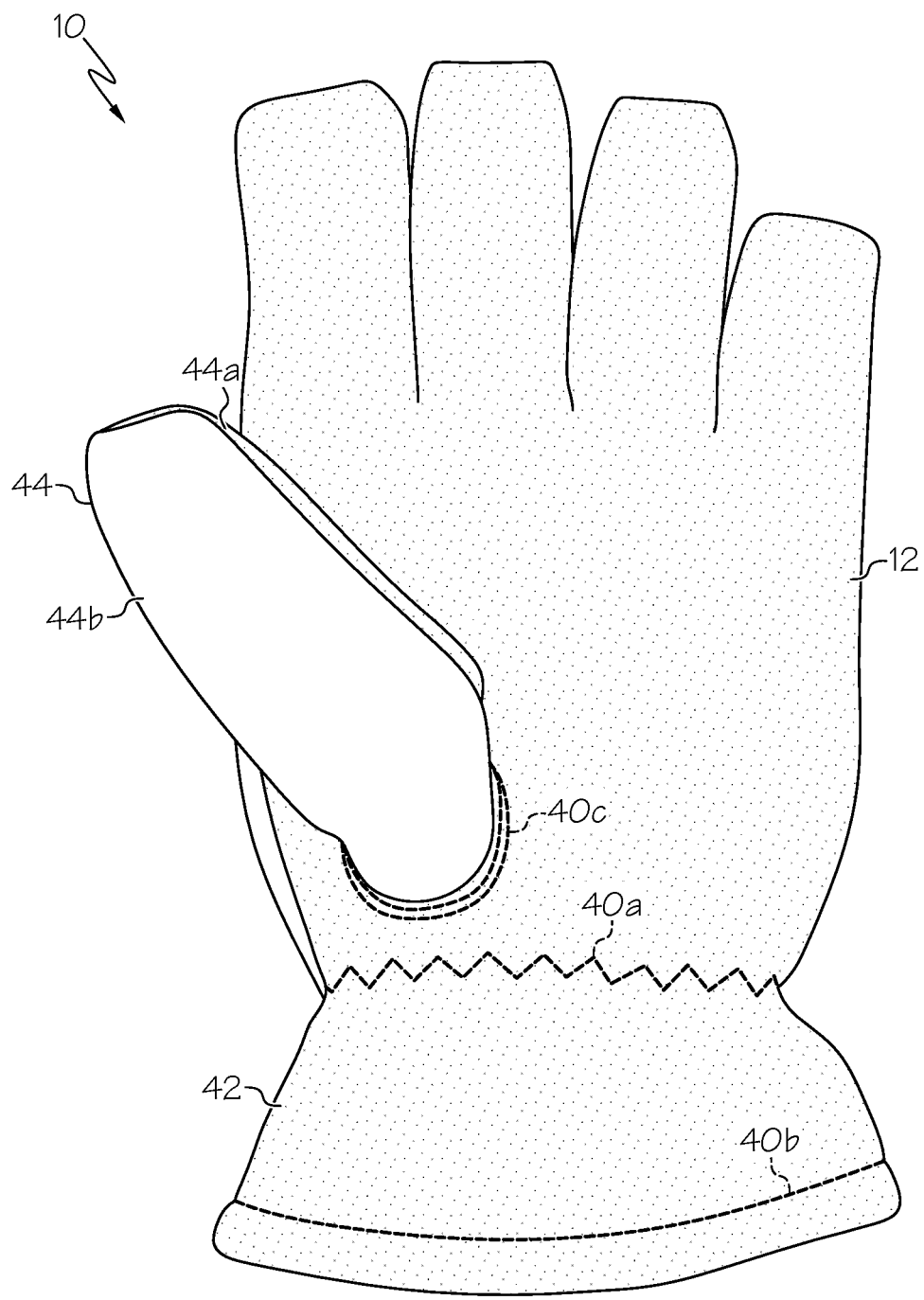
FIG. 6 depicts a perspective view of the palm portion of the protective fire glove of FIG. 1, wherein the protective fire glove includes a thumb portion, according to embodiments described herein.

Referring now to FIG. 6, the fire protective glove 10 may further include a thumb portion 44. The thumb portion 44 is shaped to at least overlay a thumb of the hand of the user. As shown, the thumb portion 44 is secured to the palm portion 12 by a stitch 40c. Stitch 40c may be a single stitch, a double stitch (as shown), or a triple stitch. The thumb portion 44 includes a thumb palm portion 44a and a thumb back portion 44b. The thumb palm portion 44a may include the same layers as the palm portion 12 as described above.

The thumb back portion 44b may include the same layers as the back portion 14 as described above. The thumb palm portion 44a and thumb back portion 44b may be secured to each other by stitching or other type of fastening. In some embodiments, the thumb palm portion 44a may be an extension of the palm portion 12 and include the same layers as the palm portion 12. In other embodiments, the thumb back portion 44b may be an extension of the back portion 14 and include the same layers as the back portion 14.

Figure 7:
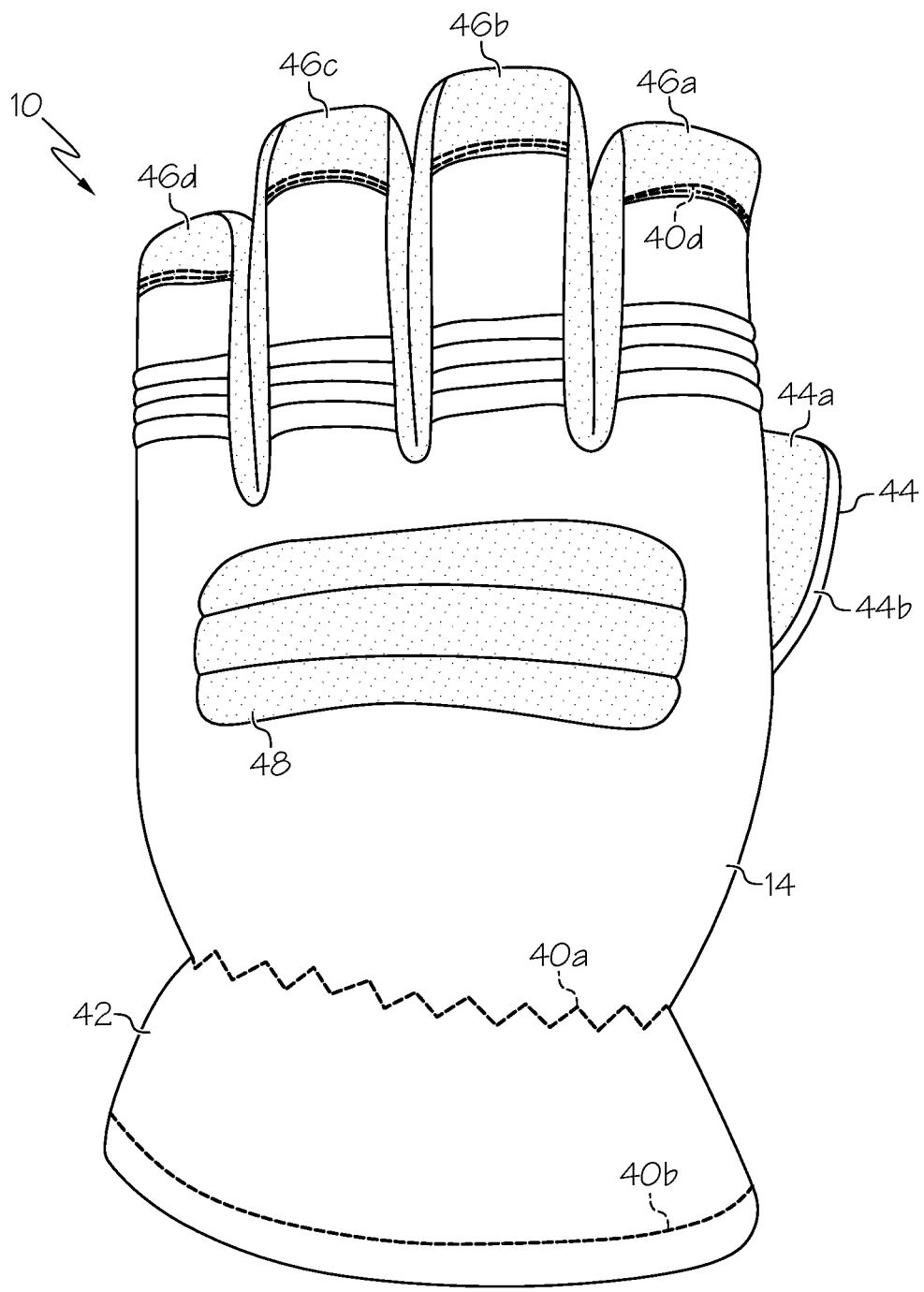
FIG. 7 depicts a perspective view of the back portion of the protective fire glove of FIG. 1, wherein the protective fire glove includes fingertip portions and a knuckle portion, according to embodiments described herein.

Referring now to FIG. 7, the fire protective glove 10 may further include fingertip portions 46a, 46b, 46c, 46d. The fingertip portions 46a, 46b, 46c, 46d are shaped to at least overlay the tops of the fingertips/nails of the hand of the user. As shown, each fingertip portion 46a, 46b, 46c, 46d is an individual layer of material stitched to the back portion 14 by stitch 40d and secured to the palm portion 12 by stitching or other type of fastening. Stitch 40d may be a single stitch, a double stitch (as shown), or a triple stitch. Fingertip portions 46a, 46b, 46c, 46d may be constructed of a material similar to that of the polymer impregnated layer 20 as described above. As explained above, the polymer impregnated in the material may provide an additional level of protection to the tops of the fingertips/nails of the hand of the user. In some embodiments, the fingertip portions 46a, 46b, 46c, 46d may be an extension of the palm portion 12 and include the same layers of the palm portion 12. In some embodiments, each fingertip portion 46a, 46b, 46c, 46d may include multiple layers similar to those of palm portion 12 described above, stitched to the back portion 14 by stitch 40d, and secured to the palm portion 12 by stitching or other type of fastening.

The fire protective glove may further include a knuckle portion 48 as illustrated in FIG. 7. The knuckle portion 48 is shaped to at least overlay the third knuckles of the hand of the user. The knuckle portion 48 may be secured to the back portion 14 by stitching or other type of fastening. The knuckle portion 48 may be constructed of a material similar to that of the polymer impregnated layer 20 as described above. As explained above, the polymer impregnated in the material may provide an additional level of protection to the third knuckles of the hand of the user.

Stitches 40a, 40b, 40c, 40d may be constructed of a thread of aramid fibers. Stiches 40a, 40b, 40c, 40d may be constructed of a thread of para-aramid fibers, such as para-aramid fibers sold under the Kevlar® brand. Stiches 40a, 40b, 40c, 40d may be constructed of a thread of meta-aramid fibers, such as meta-aramid fibers sold under the Nomex® brand.

In some embodiments, the fire protective glove 10 includes a palm portion 12 and a back portion 14. The palm portion 12 includes a polymer impregnated layer 20, a palm moisture barrier layer 22, a first palm protective layer 24, and a second palm protective layer 26. The polymer impregnated layer 20 is constructed of a silicone impregnated para-aramid fiber knit. The palm moisture barrier layer 22 is interior to the polymer impregnated layer 20 and is constructed of poly(ionic liquid)s.

The first palm protective layer 24 is interior to the palm moisture barrier layer 22 and is constructed of a meta-aramid fiber knit. The second palm protective layer 26 is interior to the first palm protective layer 24 and includes a plurality of sublayers 26a, 26b bonded to one another. Each of the plurality of sublayers 26a, 26b of the second palm protective layer 26 is constructed of a meta-aramid fiber knit. The back portion 14 includes a first back protective layer 32, a second back protective layer 34, a back moisture barrier layer 36, and a third back protective layer 38. The first back protective layer 32 is constructed of a para-aramid fiber knit.

The second back protective layer 34 is interior to the first back protective layer 32 and includes a plurality of sublayers 34a, 34b. Each of the plurality of sublayers 34a, 34b of the second back protective layer 34 is constructed of a meta-aramid fiber knit. The back moisture barrier layer 36 is interior to the second back protective layer 34 and is constructed of poly(ionic liquid)s. The third back protective layer 38 is interior to the back moisture barrier layer 36 and includes a plurality of sublayers 38a, 38b bonded to one another. Each of the plurality of sublayers 38a, 38b of the third back protective layer 38 is constructed of a meta-aramid fiber knit.

EXAMPLES

An example back portion glove pouch and a comparative glove pouch were subjected to the NFPA 7.7.25 Transmitted and Stored Thermal Energy Test. The Transmitted and Stored Thermal Energy Test is used to evaluate, on average, how long it takes to experience a second-degree burn on the back of the hand caused by radiant heat. This test is performed in accordance with ASTM F2731 on the glove body composite back side under wet conditions. The test measures the heat transfer through the composite when it is exposed to a radiant heat source at a specific heat flux and relates the transferred heat energy to a predicted time of second degree burn injury. The time to second-degree burn are recorded for each specimen. According to NFPA standards, the time to second-degree burn cannot be less than 130 seconds.

The example back portion glove pouch included the following layers, moving from the exterior to the interior of the example back portion glove pouch: a layer constructed of 360 gsm yellow Kevlar® knit, a layer constructed of 240 gsm Nomex® knit, another layer constructed of 240 gsm Nomex® knit, a layer constructed of Porelle® FR, and two layers of 240 gsm Nomex® knit bonded to one another. The comparative glove pouch included the following layers, moving from the exterior to the interior of the comparative glove pouch: a layer constructed of 1.0 mm grain cow leather, a layer constructed of 240 gsm Kevlar® knit, a layer constructed of 240 gsm Nomex® knit, a layer constructed of Porelle® moisture barrier, a layer constructed of 240 gsm Nomex® knit, and another layer constructed of 240 gsm Nomex® knit.

Tables 1 and 2 below show the stored thermal energy results for specimens of the example back portion glove pouch and for specimens of the comparative glove pouch, respectively. The average time to second degree burn for the specimens of the example back portion glove pouch was 264.4 seconds. The average time to second degree burn for the specimens of the comparative glove pouch was 151.0 seconds. As demonstrated from the test results, the example back portion glove pouch, constructed in accordance with embodiments described herein, not only meets NFPA standards, but performed significantly better than the comparative glove pouch.

TABLE 1

NFPA 7.7.25 Transmitted and Stored Thermal Energy Test results for example back portion glove pouch

| Specimen | Thickness (mm) | Water added (g) | Time to $2^{nd}$-degree burn (s) | Avg. Time to $2^{nd}$-degree burn (s) |
|---|---|---|---|---|
| 1 | 5.14 | 1.94 | 287.3 | 273.2 |
| 2 | 5.10 | 2.04 | 259.1 | |
| 3 | 5.19 | 2.40 | 257.4 | 262.3 |
| 4 | 5.11 | 2.55 | 267.1 | |
| 5 | 5.11 | 3.02 | 257.1 | 257.8 |
| 6 | 5.13 | 2.94 | 258.5 | |

TABLE 2

NFPA 7.7.25 Transmitted and Stored Thermal Energy Test results for comparative glove pouch

| Specimen | Thickness (mm) | Water added (g) | Time to $2^{nd}$-degree burn (s) | Avg. Time to $2^{nd}$-degree burn (s) |
|---|---|---|---|---|
| 1 | 4.62 | 2.09 | 143.5 | 150.9 |
| 2 | 4.55 | 2.08 | 153.5 | |
| 3 | 4.62 | 2.10 | 147.8 | |
| 4 | 4.65 | 1.91 | 158.1 | |
| 5 | 4.45 | 2.06 | 151.6 | |
| 6 | 4.52 | 2.42 | 156.1 | 149.2 |
| 7 | 4.42 | 2.57 | 161.3 | |
| 8 | 4.60 | 2.41 | 145.0 | |
| 9 | 4.50 | 2.58 | 136.6 | |
| 10 | 4.57 | 2.52 | 147.2 | |
| 11 | 4.62 | 3.02 | 157.5 | 152.8 |
| 12 | 4.50 | 3.09 | 159.0 | |
| 13 | 4.47 | 2.95 | 139.1 | |
| 14 | 4.42 | 3.10 | 161.1 | |
| 15 | 4.45 | 2.94 | 147.1 | |

As illustrated above, various embodiments of a fire protective glove are disclosed. While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a fire protective glove. It should also be understood that these embodiments are merely exemplary and are not intended to limit the scope of this disclosure.

What is claimed is:

1. A fire protective glove comprising:
   a palm portion shaped to at least overlay a palm of a hand of a user comprising:
      a polymer impregnated layer constructed of a silicone impregnated para- aramid fiber knit;
      a palm moisture barrier layer that is interior to the polymer impregnated layer, the palm moisture barrier layer being constructed of polyurethane;
      a first palm protective layer that is interior to the palm moisture barrier layer, the first palm protective layer being constructed of a meta-aramid fiber knit; and
      a second palm protective layer that is interior to the first palm protective layer, the second palm protective layer including a plurality of sublayers bonded to one another, each of the plurality of sublayers of the second palm protective layer being constructed of a meta-aramid fiber knit;

a back portion shaped to at least overlay a back of the hand of the user comprising:
  a first back protective layer constructed of a para-aramid fiber knit;
  a second back protective layer that is interior and adjacent to the first back protective layer, the second back protective layer including a plurality of sublayers, each of the plurality of sublayers of the second back protective layer being constructed of a meta-aramid fiber knit;
  a back moisture barrier layer that is interior to the second back protective layer, the back moisture barrier layer being constructed of polyurethane; and
  a third back protective layer that is interior to the back moisture barrier layer, the third back protective layer including a plurality of sublayers bonded to one another, each of the plurality of sublayers of the third back protective layer being constructed of a meta-aramid fiber knit;

a thumb portion secured to the palm portion by stitching; and a fingertip portion secured to the palm portion and the back portion, the fingertip portion being constructed of a silicone impregnated para-aramid fiber knit, wherein the palm portion is secured to the back portion by stitching.

2. The fire protective glove of claim 1, wherein the silicone impregnated para-aramid fiber knit of the polymer impregnated layer has a weight in the range from greater than or equal to about 200 gsm to less than or equal to about 400 gsm.

3. The fire protective glove of claim 1, wherein the meta-aramid fiber knit of the first palm protective layer has a weight in the range from greater than or equal to about 100 gsm to less than or equal to about 225 gsm.

4. The fire protective glove of claim 1, wherein meta-aramid fiber knit of the plurality of sublayers of the second palm protective layer has a weight in the range from greater than or equal to about 200 gsm to less than or equal to about 300 gsm.

5. The fire protective glove of claim 1, wherein the plurality of sublayers of the second palm protective layer are bonded to each other with an adhesive.

6. The fire protective glove of claim 1, wherein the para-aramid fiber knit of the first back protective layer has a weight in the range from greater than or equal to about 200 gsm to less than or equal to about 400 gsm.

7. The fire protective glove of claim 1, wherein the meta-aramid fiber knit of the plurality of sublayers of the second back protective layer has a weight in the range from greater than or equal to about 200 gsm to less than or equal to about 300 gsm.

8. The fire protective glove of claim 1, wherein the meta-aramid fiber knit of the plurality of sublayers of the third back protective layer has a weight in the range from greater than or equal to about 200 gsm to less than or equal to about 300 gsm.

* * * * *